United States Patent
Benedix et al.

(10) Patent No.: US 6,844,984 B2
(45) Date of Patent: Jan. 18, 2005

(54) PROJECTION OBJECTIVE (75) Inventors: Guenther Benedix, Jena (DE); Eberhard Piehler, Lehesten (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/665,935

(22) Filed: Sep. 19, 2003

(65) Prior Publication Data

US 2004/0125464 A1 Jul. 1, 2004

(30) Foreign Application Priority Data

Sep. 20, 2002 (DE) .......................... 102 44 586

(51) Int. Cl.$^7$ ............................................. G02B 15/14
(52) U.S. Cl. ...................... 359/679; 359/689; 359/748; 359/784; 359/792
(58) Field of Search ................................ 359/679, 689, 359/748, 784, 792

(56) References Cited

U.S. PATENT DOCUMENTS

| 5,644,435 | A  |   | 7/1997  | Shikama         |         |
|-----------|----|---|---------|-----------------|---------|
| 6,137,638 | A  | * | 10/2000 | Yamagishi et al.| 359/682 |
| 6,301,058 | B2 | * | 10/2001 | Nagahara        | 359/650 |
| 6,317,269 | B1 | * | 11/2001 | Yamamoto        | 359/651 |
| 6,515,803 | B2 | * | 2/2003  | Hirose          | 359/682 |
| 6,542,311 | B2 | * | 4/2003  | Nagahara        | 359/676 |
| 6,545,817 | B2 | * | 4/2003  | Hirose          | 359/683 |
| 6,563,650 | B2 | * | 5/2003  | Moskovich       | 359/663 |
| 6,590,716 | B2 | * | 7/2003  | Narimatsu       | 359/679 |
| 6,636,361 | B2 | * | 10/2003 | Wada            | 359/680 |
| 2002/0145809 | A1 | * | 10/2002 | Okuyama       | 359/649 |

FOREIGN PATENT DOCUMENTS

| EP | 0 058 651 B1 | 8/1982 |
| EP | 0 585 651 B1 | 6/2000 |

* cited by examiner

Primary Examiner—Evelyn A. Lester
(74) Attorney, Agent, or Firm—Patterson, Thuente, Skaar & Christensen, P.A.

(57) ABSTRACT

A projection objective having a variable focal length, preferably serving to image tilting mirror matrices or reflecting and/or transmitting LCDs, said projection objective comprising three groups of lenses (G1, G1, G3) arranged on a common optical axis, wherein, starting from the side facing the projection screen, the first lens group (G1), serving the purpose of focussing, and the second lens group (G2), serving the purpose of varying the focal length, are arranged on the optical axis in a variably positioned manner, and the third lens group (G3) is stationary.

According to the invention, the following condition is met:

$$1.0 \; h \; max < dG2\text{--}G3 < 1.5 \; h \; max$$

and $$s \leq 10 \; mm,$$

wherein h max is the maximum object height, dG2–G3 is the distance between the lens group G2 and the lens group G3 in a first position, and s is the object-side intercept distance or distance from the vertex to the object.

14 Claims, 7 Drawing Sheets

PROJECTION OBJECTIVE

FIELD OF THE INVENTION

The invention relates to a projection objective having a variable focal length, preferably serving to image tilting mirror matrices or reflecting and/or transmitting LCDs, more specifically the invention relates to a projection objective comprising three groups of lenses arranged on a common optical axis, wherein, starting from the side facing the projection screen, the first lens group, serving the purpose of focussing, and the second lens group, serving the purpose of varying the focal length, are arranged on the optical axis in a movable manner, and the third lens group is stationary.

BACKGROUND OF THE INVENTION

Generally known projection objectives having variable focal lengths and used especially for images of the aforementioned type, as described, for example, in EP 058 651 B1 and U.S. Pat. No. 5,644,435, differ from each other essentially in the number of lenses, their arrangement and the technical construction data in connection with the conditions applicable to the optical system.

Since it is desirable for applications, in most cases, to vary the size and location of the image, thus adjusting the projection to the most diverse spatial dimensions, use is made mainly of zoom projection systems.

Therefore, projection objectives consist mainly of a zoom device, a compensating device and a focusing device of the type known from photographic lenses.

As a result in order to achieve a high image quality, such systems comprise many lens elements, are structurally very complex and, thus, very expensive. There is a need in the art for a simple, inexpensive projection objective including relatively few lens elements.

SUMMARY OF THE INVENTION

Therefore, it is an object of the present invention, to provide a projection objective of the above-mentioned type, which reduces the technical complexity of its production due to a small number of optical elements having minimized dimensions, while simultaneously ensuring a good imaging performance.

According to the invention, this object is achieved in that the following conditions are met:

$$1.0 \text{ h max} < dG2–G3 < 1.5 \text{ h max}$$

and $$s \leq 10 \text{ mm},$$

wherein h max is the maximum object height, dG2–G3 is the distance between lens group G2 and lens group G3 in a first position, and s is the object-side intercept distance. That is, s is the distance from the object side vertex of lens group G3 to the object along the optical axis.

The projection objective according to the invention comprises relatively few optical elements and is, thus, very inexpensive to manufacture.

In order to improve its imaging performance, the projection objective is conveniently designed such that the following conditions are met:

$$1.2 \text{ fl} < fG1 < 1.7 \text{ fl},$$

$$0.7 \text{ fl} < fG2 < 1.1 \text{ fl},$$

$$1.5 \text{ fl} < fG3 < 2.0 \text{ fl},$$

wherein
fl=the total focal length of the objective in a first position,
fG1=the absolute value of the focal length of the first lens group G1,
fG2=the absolute value of the focal length of the second lens group G2, and
fG3=the absolute value of the focal length of the third lens group G3.

For example, one embodiment of the invention consists in that, starting from the side facing the projection screen, the first lens group consists of a negative meniscus, a positive meniscus and a negative lens, the second lens group consists of a negative meniscus or of a negative assembly which consists of a positive meniscus and of a negative meniscus, a positive lens and a positive assembly which consists of a positive lens and of a negative lens, and the third lens group consists of at least one positive lens.

Advantageous further embodiments of the projection objective according to the invention consist in that the following conditions are met:

$$2.0 < L/fl < 30$$

$$1.68 < navg < 1.74$$

$$40.0 < vavg < 44.0,$$

wherein
L=the entire length of the objective,
navg=the average refractive index of the objective, and
vavg=the average value of the Abbe dispersion number of the objective.

The projection objective according to the invention will be explained in more detail with reference to embodiment examples. In doing so, identical reference numerals designate identical elements in the individual Figures.

DETAILED DESCRIPTION OF THE INVENTION

Figure 1:
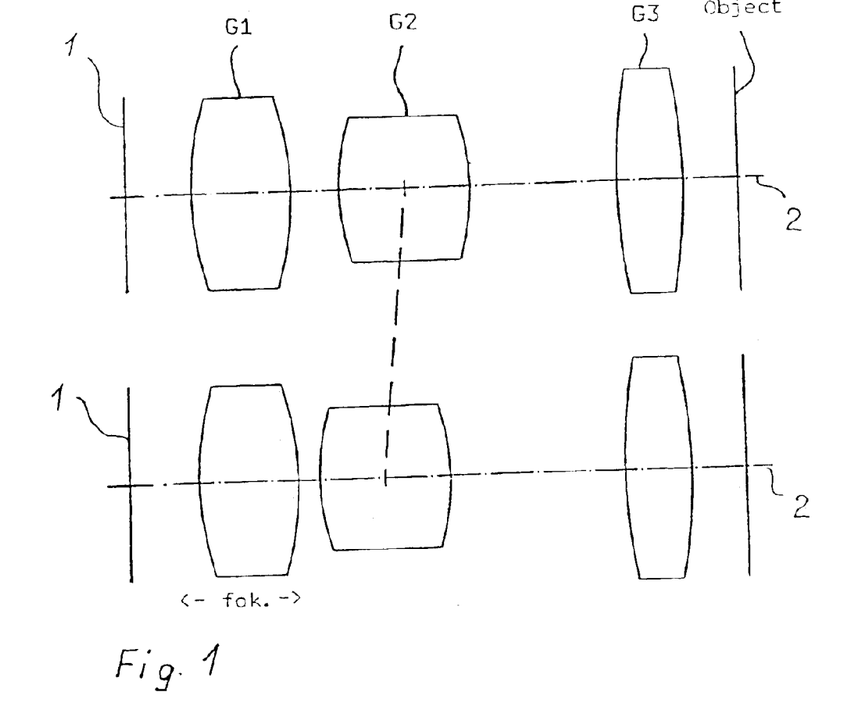
FIG. 1 shows a schematic representation of the projection objective.

FIG. 1 shows the general structure of the projection objective comprising, starting from the projection screen 1 and arranged on the common optical axis 2, the first lens group G1, the second lens group G2 and the third lens group G3, wherein, as is evident from the second partial image, the second lens group G2, which is used for correction of the focal length (<-fok.->), occupies a changed (corrected) position on the optical axis 2. The third lens group G3 facing the object remains unchanged in its position on the optical axis 2, while the first lens group G1 is displaceably arranged for the purpose of focusing the objective.

Figure 2:
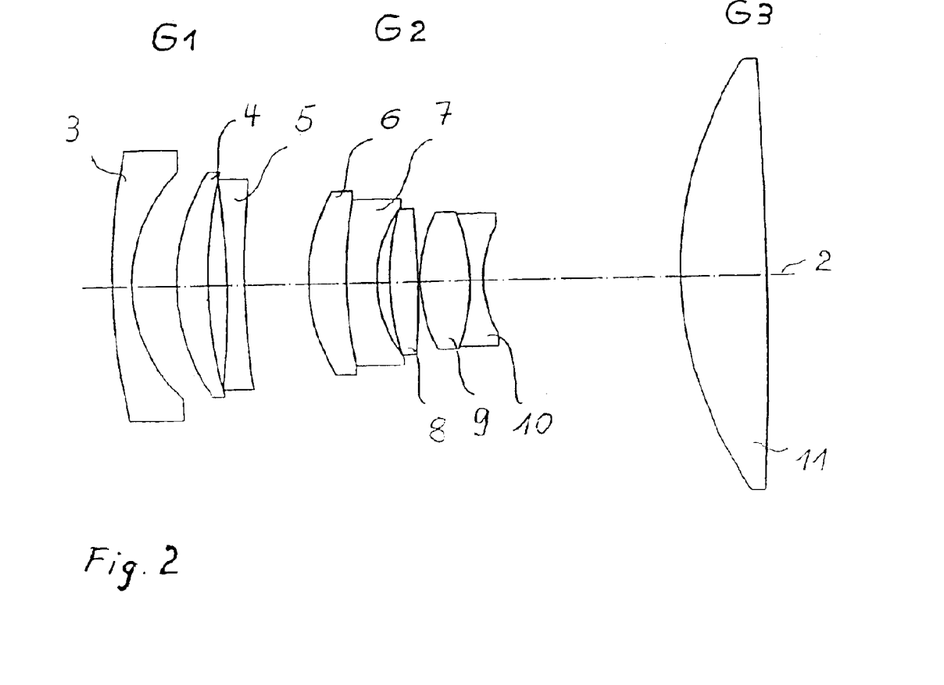
FIG. 2 shows a schematic representation of the projection objective with the assembly being arranged as the first element in the second lens group G2.

FIG. 2 shows the schematic representation of the projection objective comprising a negative meniscus lens 3, a positive meniscus lens 4 as well as a negative lens 5, arranged in the lens group G1.

In this example, the lens group G2 consists of a positive meniscus lens 6 and a negative meniscus lens 7 (assembly), of a positive lens 8 and of a positive assembly consisting of a positive lens 9 and of a negative lens 10.

The lens group G3 is characterized by a positive lens 11.

Figure 3:
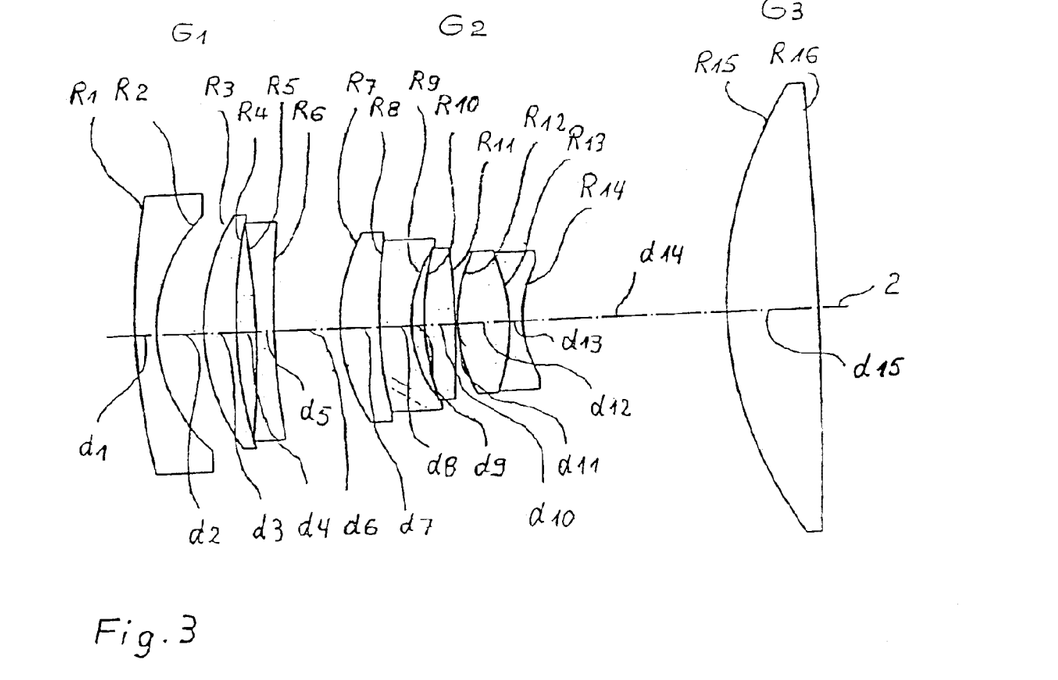
FIG. 3 shows a schematic representation of the radiuses Ri and of the air spaces or lens thicknesses di according to FIG. 2.

FIG. 3 shows the denoting of the radiuses Ri (i=1 to 16) and the air spaces or lens thicknesses di (i=1 to 16) of the variant of the projection objective shown in FIG. 2. On this basis, said variant is represented by two embodiment examples differing in their constructional data. The constructional data of the embodiment examples thereof are shown in Tables 1 and 2 in conjunction with Table 5, which follow the embodiment examples.

Figure 4:
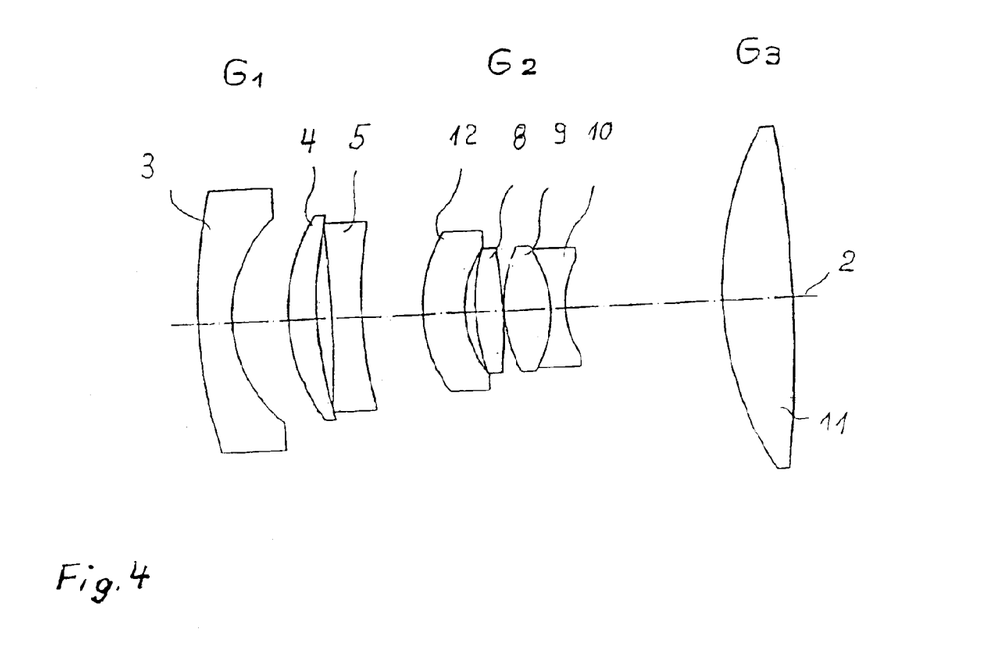
FIG. 4 shows a schematic representation of the projection objective with the meniscus lens being arranged as the first element in the second lens group G2.
Figure 5:
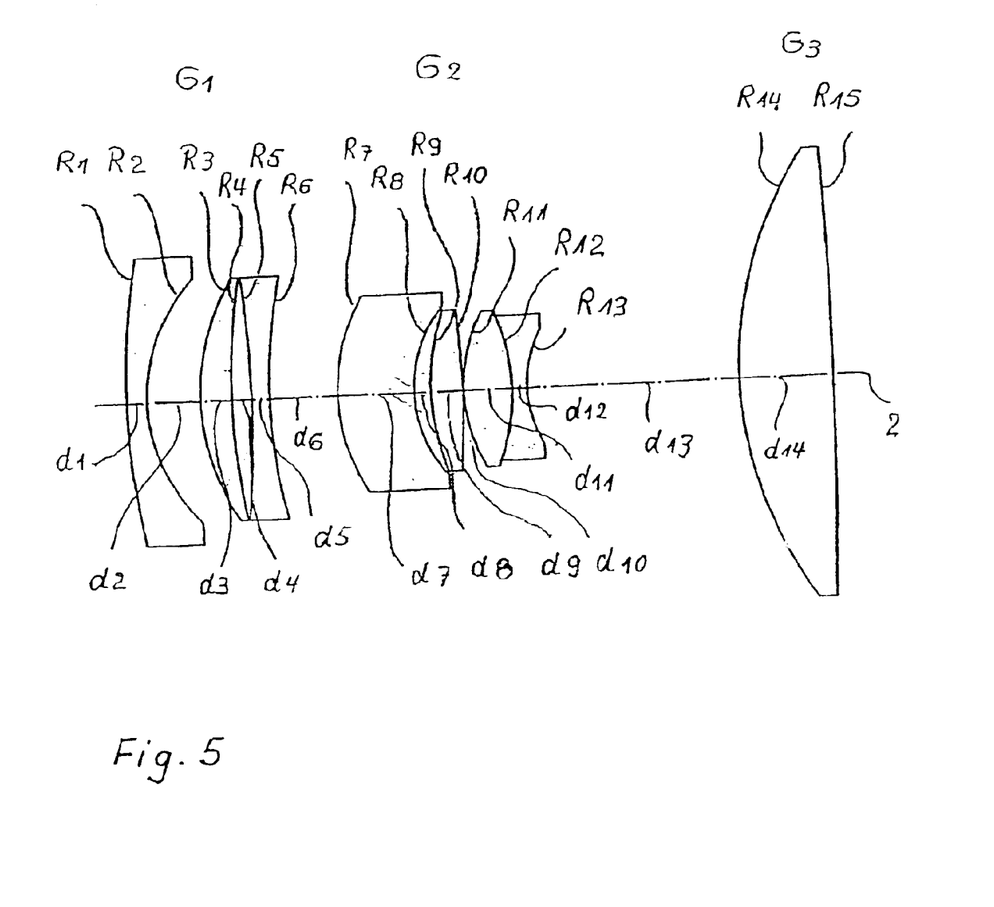
FIG. 5 shows a schematic representation of the radiuses Ri and of the air spaces or lens thicknesses di according to FIG. 4.

In variation of the example according to FIGS. 2 and 3, FIG. 4 shows the representation of the projection objective with a negative meniscus lens 12 being arranged as the first element in the second lens group G2, instead of the assembly consisting of the positive meniscus lens 6 and a negative meniscus lens 7. In addition, FIG. 5 shows the denoting of the radii Ri (i=1 to 15) and the air spaces or lens thicknesses di (i=1 to [[14]]16). Based thereon, this alternative embodiment is characterized by two embodiment examples differing in their constructional data, shown in Tables 3 and 4 in conjunction with Table 5. FIG. 5 also shows the air space d16, the object-side vertex to object distance or object-side intercept distance (designated "s".)

Figure 6:
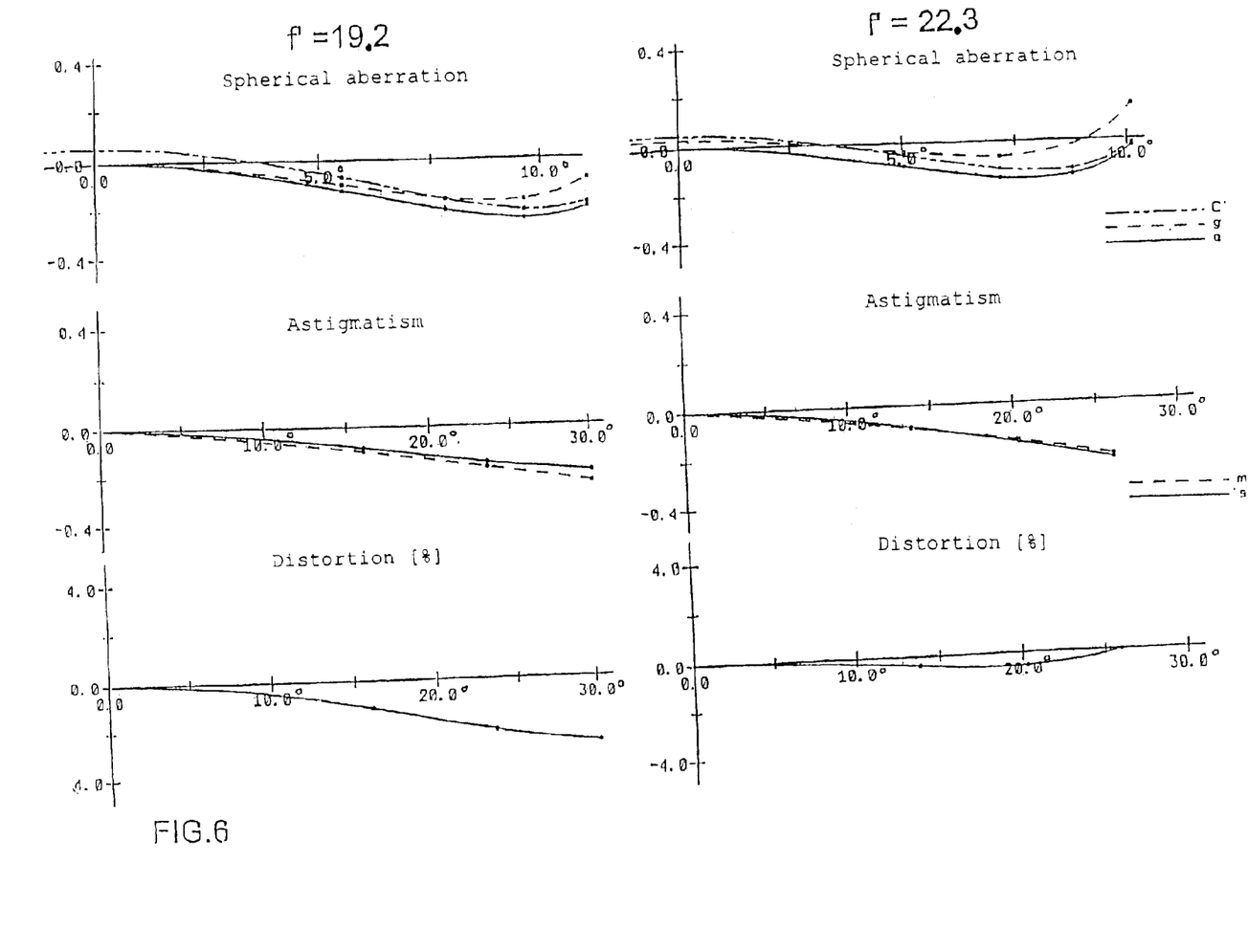
FIG. 6 shows a graph of the imaging errors for the final positions of the focal length range (f=19.2 and f=22.5) of a first embodiment example according to FIGS. 2 and 3.
Figure 7:
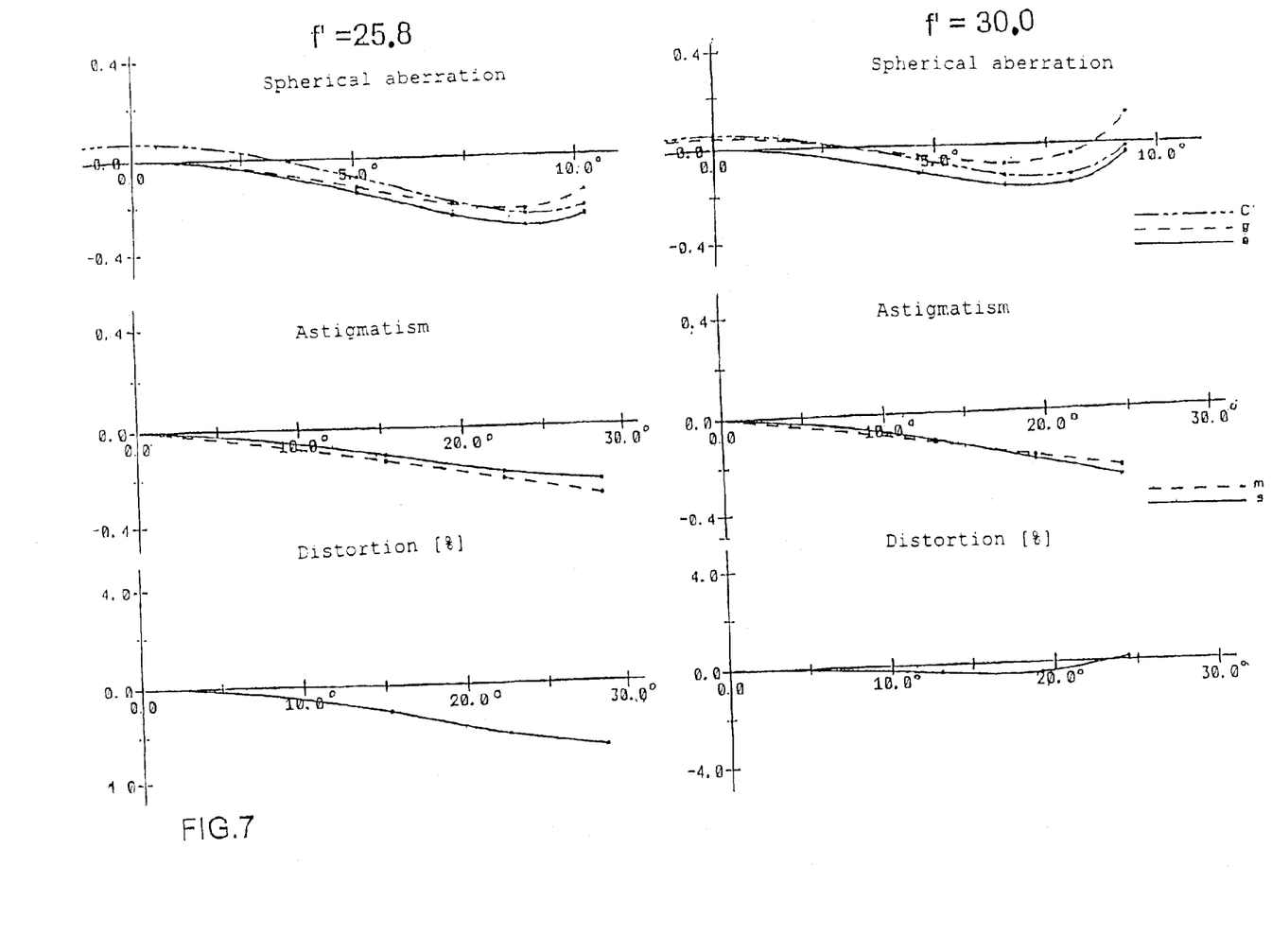
FIG. 7 shows a graph of the imaging errors for the final positions of the focal length range (f=25.8 and f=30.0) of a second embodiment example according to FIGS. 2 and 3.

FIGS. 6 and 7 are graphs showing the imaging errors for the end positions of the focal length range f=19.2 or f=22.5 (first embodiment example) and f=25.8 and f=30.0 (second embodiment example) according to the variant of the projection objective of FIGS. 2 and 3.

Figure 8:
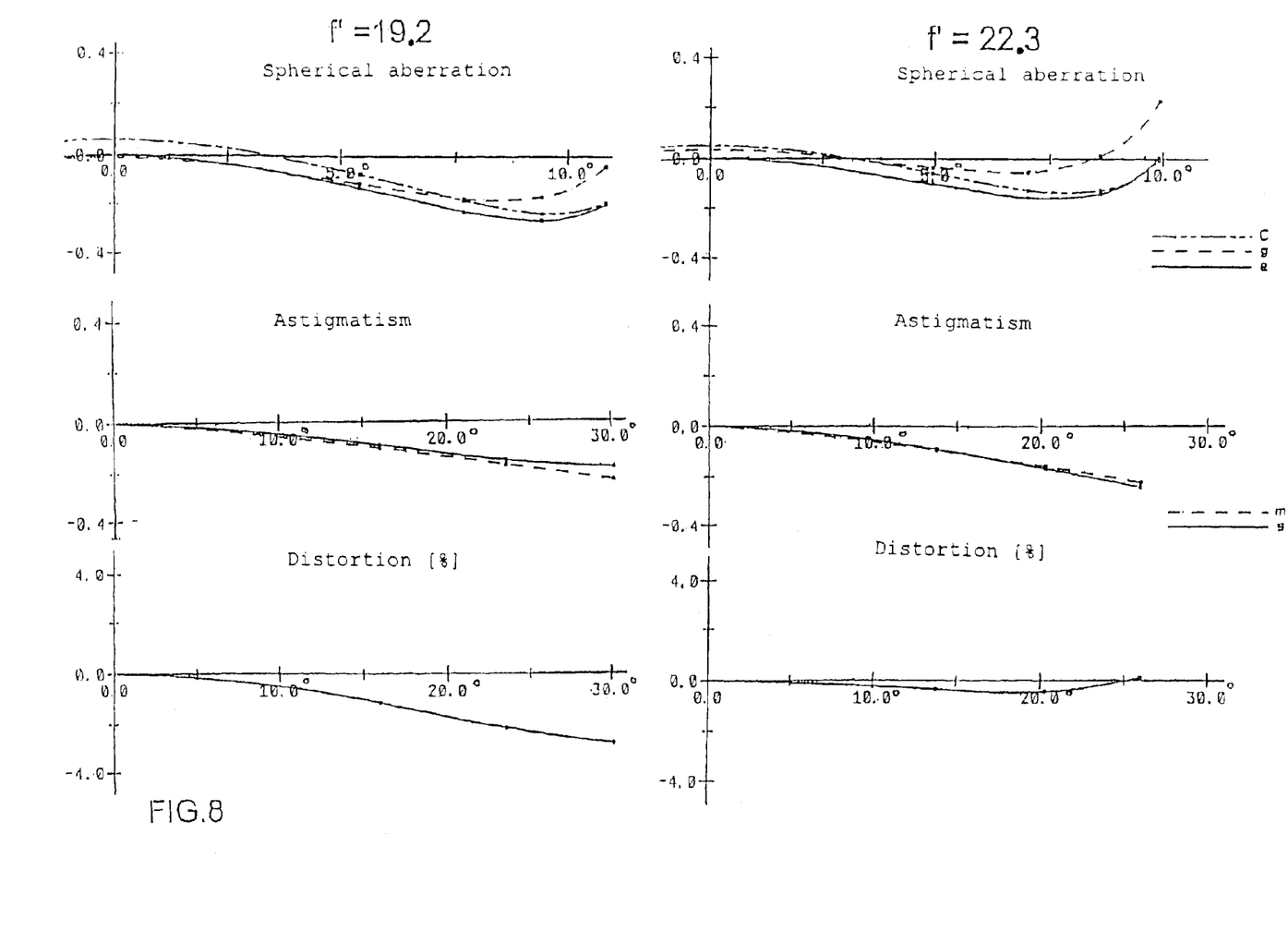
FIG. 8 shows a graph of the imaging errors for the final positions of the focal length range (f=19.2 and f=22.5) of a first embodiment example according to FIGS. 4 and 5.
Figure 9:
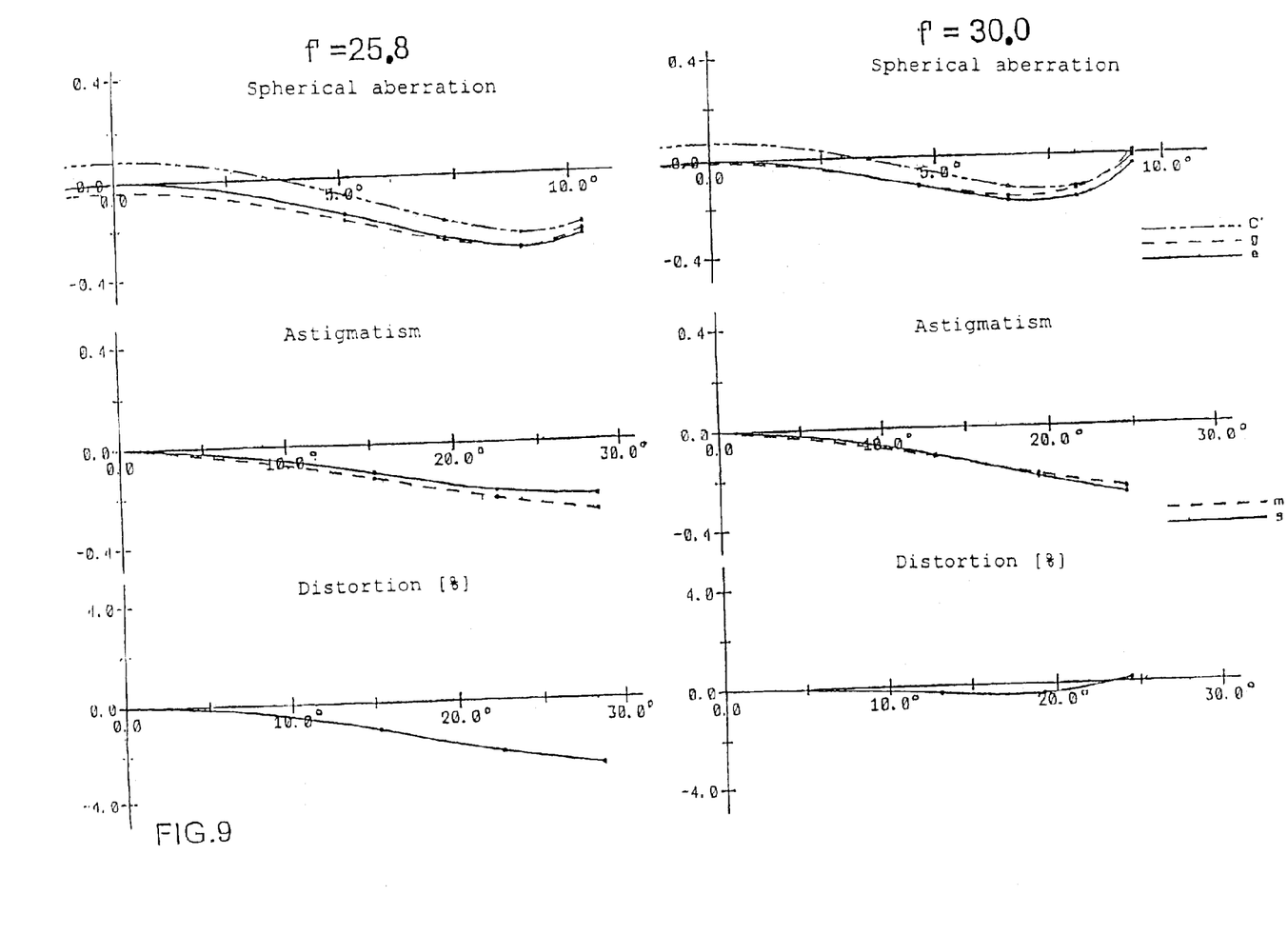
FIG. 9 shows a graph of the imaging errors for the final positions of the focal length range (f=25.8 and f=30.0) of a second embodiment example according to FIGS. 4 and 5.

Analogous to this type of representation, FIGS. 8 and 9 show the imaging errors of both embodiment examples of the projection objective according to the arrangements of groups of lenses of FIGS. 4 and 5 for the same end positions of the focal length ranges.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

TABLE 1

| Radiuses | Thickness and air spaces | Refractive indices $n_e$ | Abbe dispersion number ($v_e$) |
|---|---|---|---|
| $R_1 = 40.10$ | $d_1 = 1.50$ | $n_1 = 1.70557$ | $v_1 = 41.0$ |
| $R_2 = 12.68$ | $d_2 = 5.81$ | | |
| $R_3 = 17.70$ | $d_3 = 2.76$ | $n_2 = 1.79192$ | $v_2 = 25.5$ |
| $R_4 = 29.64$ | $d_4 = 1.62$ | | |
| $R_5 = -114.59$ | $d_5 = 2.02$ | $n_3 = 1.59143$ | $v_3 = 60.9$ |
| $R_6 = 48.35$ | $d_6 = 4.65$ | | |
| $R_7 = 13.63$ | $d_7 = 2.80$ | $n_4 = 1.80642$ | $v_4 = 34.7$ |
| $R_8 = 36.78$ | $d_8 = 2.09$ | $n_5 = 1.73429$ | $v_5 = 28.2$ |
| $R_9 = 9.86$ | $d_9 = 1.08$ | | |
| $R_{10} = 21.13$ | $d_{10} = 2.41$ | $n_6 = 1.80811$ | $v_6 = 46.3$ |
| $R_{11} = -56.23$ | $d_{11} = 0.11$ | | |
| $R_{12} = 11.55$ | $d_{12} = 3.90$ | $n_7 = 1.80811$ | $v_7 = 46.3$ |
| $R_{13} = -13.63$ | $d_{13} = 1.18$ | $n_8 = 1.67765$ | $v_8 = 31.8$ |
| $R_{14} = 8.29$ | $d_{14} = 14.01$ | | |
| $R_{15} = 28.18$ | $d_{15} = 7.17$ | $n_9 = 1.67340$ | $v_9 = 46.9$ |
| $R_{16} = -113.02$ | | | |

| Variable lens position | air space | air space | focal length |
|---|---|---|---|
| 1 | $d_6 = 4.65$ | $d_{14} = 14.01$ | $f'_1 = 19.2$ |
| 2 | $d_6 = 2.12$ | $d_{14} = 16.56$ | $f'_2 = 22.3$ |

TABLE 2

| Radiuses | Thickness and air spaces | Refractive indices $n_e$ | Abbe dispersion number ($v_e$) |
|---|---|---|---|
| $R_1 = 60.43$ | $d_1 = 1.80$ | $n_1 = 1.67341$ | $v_1 = 46.8$ |
| $R_2 = 14.75$ | $d_2 = 4.14$ | | |
| $R_3 = 18.97$ | $d_3 = 2.94$ | $n_2 = 1.69413$ | $v_2 = 31.1$ |
| $R_4 = 41.57$ | $d_4 = 1.80$ | | |
| $R_5 = -76.63$ | $d_5 = 1.60$ | $n_3 = 1.52458$ | $v_3 = 59.2$ |
| $R_6 = 76.63$ | $d_6 = 5.89$ | | |
| $R_7 = 17.15$ | $d_7 = 3.41$ | $n_4 = 1.83935$ | $v_4 = 37.0$ |
| $R_8 = 39.81$ | $d_8 = 2.80$ | $n_5 = 1.73430$ | $v_5 = 28.2$ |
| $R_9 = 11.97$ | $d_9 = 1.17$ | | |
| $R_{10} = 24.76$ | $d_{10} = 2.64$ | $n_6 = 1.77621$ | $v_6 = 49.4$ |
| $R_{11} = -79.72$ | $d_{11} = 0.20$ | | |
| $R_{12} = 14.23$ | $d_{12} = 4.60$ | $n_7 = 1.80832$ | $v_7 = 46.3$ |
| $R_{13} = -17.40$ | $d_{13} = 1.20$ | $n_8 = 1.65222$ | $v_8 = 33.6$ |
| $R_{14} = 10.37$ | $d_{14} = 18.21$ | | |
| $R_{15} = 35.48$ | $d_{15} = 8.10$ | $n_9 = 1.67341$ | $v_9 = 46.8$ |
| $R_{16} = -347.16$ | | | |

| Variable lens position | air space | air space | focal length |
|---|---|---|---|
| 1 | $d_6 = 5.89$ | $d_{14} = 18.21$ | $f'_1 = 25.8$ |
| 2 | $d_6 = 2.55$ | $d_{14} = 21.56$ | $f'_2 = 30.0$ |

TABLE 3

| Radiuses | Thickness and air spaces | Refractive indices $n_e$ | Abbe dispersion number ($v_e$) |
|---|---|---|---|
| $R_1 = 43.80$ | $d_1 = 3.00$ | $n_1 = 1.67402$ | $v_1 = 39.0$ |
| $R_2 = 11.87$ | $d_2 = 4.93$ | | |
| $R_3 = 16.30$ | $d_3 = 2.50$ | $n_2 = 1.72310$ | $v_2 = 29.3$ |
| $R_4 = 34.64$ | $d_4 = 1.30$ | | |
| $R_5 = -112.67$ | $d_5 = 2.60$ | $n_3 = 1.61520$ | $v_3 = 58.5$ |
| $R_6 = 40.07$ | $d_6 = 5.40$ | | |
| $R_7 = 12.65$ | $d_7 = 3.74$ | $n_4 = 1.81264$ | $v_4 = 25.2$ |
| $R_8 = 9.47$ | $d_8 = 0.95$ | | |
| $R_9 = 19.32$ | $d_9 = 2.43$ | $n_5 = 1.75844$ | $v_5 = 52.1$ |
| $R_{10} = -40.60$ | $d_{10} = 0.10$ | | |
| $R_{11} = 11.88$ | $d_{11} = 4.23$ | $n_6 = 1.79012$ | $v_6 = 44.0$ |

TABLE 3-continued

| Radiuses | Thickness and air spaces | Refractive indices $n_e$ | Abbe dispersion number ($v_e$) |
|---|---|---|---|
| $R_{12} = -9.94$ | $d_{12} = 1.28$ | $n_7 = 1.67765$ | $v_7 = 31.8$ |
| $R_{13} = 8.28$ | $d_{13} = 14.00$ | | |
| $R_{14} = 29.40$ | $d_{14} = 6.30$ | $n_8 = 1.67340$ | $v_8 = 46.9$ |
| $R_{15} = -108.14$ | | | |

| Variable lens position | air space | air space | focal length |
|---|---|---|---|
| 1 | $d_6 = 5.40$ | $d_{14} = 14.00$ | $f'_1 = 19.2$ |
| 2 | $d_6 = 2.96$ | $d_{14} = 16.51$ | $f'_2 = 22.3$ |

TABLE 4

| Radiuses | Thickness and air spaces | Refractive indices $n_e$ | Abbe dispersion number ($v_e$) |
|---|---|---|---|
| $R_1 = 64.11$ | $d_1 = 1.70$ | $n_1 = 1.67402$ | $v_1 = 39.0$ |
| $R_2 = 15.05$ | $d_2 = 4.59$ | | |
| $R_3 = 19.17$ | $d_3 = 2.80$ | $n_2 = 1.65222$ | $v_2 = 33.6$ |
| $R_4 = 56.56$ | $d_4 = 1.75$ | | |
| $R_5 = -89.83$ | $d_5 = 1.54$ | $n_3 = 1.48914$ | $v_3 = 70.2$ |
| $R_6 = 45.05$ | $d_6 = 5.95$ | | |
| $R_7 = 16.13$ | $d_7 = 6.46$ | $n_4 = 1.70824$ | $v_4 = 39.1$ |
| $R_8 = 11.93$ | $d_8 = 1.40$ | | |
| $R_9 = 21.84$ | $d_9 = 2.60$ | $n_5 = 1.80832$ | $v_5 = 46.3$ |
| $R_{10} = -79.02$ | $d_{10} = 0.10$ | | |
| $R_{11} = 13.81$ | $d_{11} = 4.24$ | $n_6 = 1.80832$ | $v_6 = 46.3$ |
| $R_{12} = -17.01$ | $d_{12} = 1.30$ | $n_7 = 1.71142$ | $v_7 = 30.0$ |
| $R_{13} = 10.10$ | $d_{13} = 18.19$ | | |
| $R_{14} = 35.42$ | $d_{14} = 7.90$ | $n_8 = 1.67341$ | $v_8 = 46.8$ |
| $R_{15} = -348.47$ | | | |

| Variable lens position | air space | air space | focal length |
|---|---|---|---|
| 1 | $d_6 = 5.95$ | $d_{14} = 18.19$ | $f'_1 = 25.8$ |
| 2 | $d_6 = 2.57$ | $d_{14} = 21.55$ | $f'_2 = 30.0$ |

TABLE 5

| Embodiment example | Table 1 | Table 2 | Table 3 | Table 4 |
|---|---|---|---|---|
| max. angle of aperture [°] | 11.1 | 10.3 | 10.9 | 10.3 |
| max. aperture ratio | 1:2.6 | 1:2.8 | 1:2.6 | 1:2.8 |
| zoom factor $f'_2/f'_1$ | 1.2 | 1.2 | 1.2 | 1.2 |
| focal length, first group | −27.7 | −37.0 | −27.2 | −37.2 |
| focal length, second group | 17.3 | 21.8 | 16.9 | 22.0 |
| focal length, third group | 34.2 | 48.2 | 35.0 | 48.1 |
| Total focal length f'1 of the system | 19.25 | 25.8 | 19.26 | 25.8 |
| focal length, first group/f'1 | −1.44 | −1.44 | −1.41 | −1.44 |
| focal length, second group/f'1 | 0.90 | 0.85 | 0.88 | 0.85 |
| focal length, third group/f'1 | 1.78 | 1.87 | 1.82 | 1.87 |
| object-side intercept distance (s) also d16 | 4.3 | 6.0 | 4.7 | 6.1 |
| object-side intercept distance/f'1 (s/f'1) | 0.22 | 0.23 | 0.24 | 0.24 |
| objective length | 53.1 | 60.5 | 52.8 | 60.5 |
| objective length/f'1 | 2.76 | 2.34 | 2.74 | 2.34 |
| maximum object height | 10.9 | 13.8 | 10.9 | 13.8 |
| distance (2nd group - 3rd group in position 1) | 14.0 | 18.2 | 14.0 | 18.2 |
| distance/max. object height | 1.29 | 1.33 | 1.28 | 1.33 |
| average refractory index | 1.73299 | 1.70844 | 1.71557 | 1.69064 |
| average Abbe dispersion number | 40.2 | 42.0 | 40.8 | 43.9 |

What is claimed is:

1. A variable focal length projection objective, preferably serving to image tilting mirror matrices or reflecting and/or transmitting LCDs, said projection objective comprising a first group of lenses, a second group of lenses and a third group of lenses arranged on a common optical axis, wherein, starting from a side facing a projection screen, the first group of lenses, serving the purpose of focussing, and the second group of lenses, serving the purpose of varying the focal length, are variably positionable on the optical axis, and the third group of lenses is stationary on the optical axis, wherein:

1.0 h max<dG2–G3<1.5 h max and s≦10 mm, wherein h max is a maximum object height, dG2–G3 is distance between the second group of lenses and the third group of lenses in a first position, and s is the distance from a back vertex of the third group of lenses to an object.

2. The projection objective as claimed in claim 1, wherein:

1.2 fl<fG1<1.7 fl, wherein fl is the total focal length of the objective in a first position and fG1 is the absolute value of the focal length of the first group of lenses.

3. The projection objective as claimed in claim 1, wherein:

0.7 fl<fG2<1.1 fl, wherein fl is the total focal length of the objective in a first position and fG2 is the absolute value of the focal length of the second group of lenses.

4. The projection objective as claimed in claim 1, wherein:

1.5 fl<fG3<2.0 fl, wherein fl is the total focal length of the objective in a first position and fG3 is the absolute value of the focal length of the third group of lenses.

5. The projection objective as claimed in claim 1, wherein, starting from the side facing the projection screen:
the first group of lenses consists of a negative meniscus, a positive meniscus and a negative lens,
the second group of lenses consists of a negative meniscus or of a negative assembly consisting of a positive meniscus and a negative meniscus; of a positive lens and of a positive assembly consisting of a positive lens and a negative lens, and
the third group of lenses comprises at least one positive lens.

6. The projection objective as claimed in claim 2, wherein, starting from the side facing the projection screen:
the first group of lenses consists of a negative meniscus, a positive meniscus and a negative lens,
the second group of lenses consists of a negative meniscus or of a negative assembly consisting of a positive meniscus and a negative meniscus; of a positive lens and of a positive assembly consisting of a positive lens and a negative lens, and the third group of lenses comprises at least one positive lens.

7. The projection objective as claimed in claim 3, wherein, starting from the side facing the projection screen:
the first group of lenses consists of a negative meniscus, a positive meniscus and a negative lens,
the second group of lenses consists of a negative meniscus or of a negative assembly consisting of a positive meniscus and a negative meniscus; of a positive lens and of a positive assembly consisting of a positive lens and a negative lens, and
the third group of lenses comprises at least one positive lens.

8. The projection objective as claimed in claim 4, wherein, starting from the side facing the projection screen:
the first group of lenses consists of a negative meniscus, a positive meniscus and a negative lens,
the second group of lenses consists of a negative meniscus or of a negative assembly consisting of a positive meniscus and a negative meniscus;
of a positive lens and of a positive assembly consisting of a positive lens and a negative lens, and
the third group of lenses comprises at least one positive lens.

9. The projection objective as claimed in claim 1, wherein:

$2.0 < L/fl < 3.0$, wherein fl is the total focal length of the objective in a first position and L is the entire length of the objective.

10. The projection objective as claimed in claim 5, wherein:

$2.0 < L/fl < 3.0$, wherein fl is the total focal length of the objective in a first position and L is the entire length of the objective.

11. The projection objective as claimed in claim 1, wherein:

$1.68 < navg < 1.74$, wherein navg is the average refractive index of the objective.

12. The projection objective as claimed in claim 5, wherein:

$1.68 < navg < 1.74$, wherein navg is the average refractive index of the objective.

13. The projection objective as claimed in claim 1, wherein:

$40.0 < vavg < 44.0$, wherein vavg is the average value of the Abbe dispersion number of the objective.

14. The projection objective as claimed in claim 5, wherein:

$40.0 < vavg < 44.0$, wherein vavg is the average value of the Abbe dispersion number of the objective.

* * * * *